United States Patent [19]

Bennett et al.

[11] 3,821,706

[45] June 28, 1974

[54] COMPUTER SYSTEM

[75] Inventors: Melvin T. Bennett; Thomas L. Vlach; Allan I. Edwin; Gino Venturi, all of Ann Arbor, Mich.

[73] Assignee: Interactive Systems, Inc., Ann Arbor, Mich.

[22] Filed: Mar. 29, 1973

[21] Appl. No.: 345,945

[52] U.S. Cl. .......................... 340/163 H, 340/147 R

[51] Int. Cl. .............................................. H04q 9/00

[58] Field of Search ...................... 340/163 R, 147 R

[56] References Cited

UNITED STATES PATENTS 3,706,086 12/1972 Farnsworth .................... 340/163 X

*Primary Examiner*—Harold I. Pitts

*Attorney, Agent, or Firm*—Fisher, Krass, Young & Gerhardt

[57] ABSTRACT

A plurality of remote terminals are connected to a central computer through a full duplex communication channel. Each terminal has a register which stores the unique address for that terminal, a counter and a comparator circuit for determining identity between the state of the counter and the address. The computer transmits messages to all of the remote terminals consisting of digital word groups preceded by a particular terminal address. These messages are received by all of the terminals and only processed by the terminal so addressed. All of the terminals advance their counters in response to each word transmitted by the computer, whether that word is addressed to them or not. In the absence of a message to be sent to the terminals, the computer transmits an idle word which advances all of the counters. Upon the occurrence of identity between its counter and its address, a terminal will transmit any available message to the computer on the return channel. Periodically, a word is sent out by the computer resynchronizing all of the counters. In one alternate embodiment the central station communicates with a plurality of satellite stations, each of which services a plurality of terminals and interrogates them in sequence, one each time that satellite's counter coincides with its address. In another alternate embodiment all of the terminals connected to a particular satellite are sequentially interrogated as the counter in the satellite is advanced by sequential words generated by the computer, and then the computer transmits the address of another satellite causing its terminals to be sequentially interrogated.

21 Claims, 5 Drawing Figures

COMPUTER SYSTEM

BACKGROUND OF THE INVENTION

1. Field of the Invention.

This invention relates to systems for transmitting digital signals between a central station and a plurality of remotely located terminals joined to the central station by a common communication channel and more particularly to systems for allowing the terminals to communicate with the central station on a single channel on a time shared basis.

2. Background of the Invention.

Digital computer systems often employ a plurality of remotely located terminals connected to the computer, or central station, through a wired or wireless communication channel. The terminals are adapted to receive messages from the computer and to transmit messages to the computer. Such systems are typically used for information systems in retail establishments and factories, time sharing digital computer systems, interactive cable television systems and the like.

One problem involved with such systems relates to the need for a plurality of terminals to share limited capacity communication links with the master computer. Typically the master will only send out a single message at a time preceded by the address of the terminal being addressed so that the selected terminal alone will respond to the message. However, since the terminals act as input devices in a generally asynchronous manner, it is conceivable that all or a large number of the terminals may want to send messages to the master station at the same time. One arrangement for dealing with the situation allows the first terminal with a message to "grab" the return communication line to the master. The rest of the terminals must then effectively stand in line to wait for the available communication channel. In other systems the master will poll the terminals by sending out their addresses in a sequential manner to ask whether they have a message to be sent to the computer. When a terminal is so addressed, it will either be provided with a subsequent time slot in which to transmit any available message or it will be allowed to grab the line and use it until its full message is sent, at which time the master will resume its interrogation sequence.

One form of polling arrangement has been suggested wherein each terminal stores a unique address and the master and each of the terminals contain counters which are periodically advanced in synchronism with one another. The status of the counter in a terminal is compared with its address; when the two are in accord the terminal may transmit a message to the master. The master identifies the source of a message on the basis of the status of its own counter.

This arrangement has important advantages over alternative polling techniques in that the master need not transmit the addresses of the polled terminals nor must the terminals identify themselves when responding to the master. Not only is time and communication capacity conserved, but the possibility of error based on erroneous transmission or reception of an address is minimized. When the remote terminal is located a long distance from the master station the master need not wait for the time required for an address to propogate to the remote terminal and for the message to propogate back before interrogating the next terminal.

The problems associated with this type of polling system center about the difficulty of maintaining the synchronism of the master counter and all of the terminal counters and, in large systems, the problem of messages sent by sequentially addressed terminals interfering with one another because of the propogation time of the communication channel. The present invention is addressed to polling remote terminal systems of this type and provides an arrangement which solves many of these problems in a reliable and economic manner.

SUMMARY OF THE INVENTION

The present invention involves an arrangement wherein the counters in the master unit and in each of the remotely located terminals are advanced each time a word is transmitted from the master to any one of the terminals. This word may consist of the address of a particular terminal, a message in the form of digitally encoded data or text, a digital control signal for a terminal so addressed, or an "idle" word which does nothing more than advance all of the counters. When the counter at a terminal is advanced to that terminal's address, the terminal may then transmit a single word to the master. Periodically, preferably at least once in each full cycle of the counters, a digital word is transmitted by the master which resets all of the counters to zero. In this manner if a counter in a particular terminal goes out of synchronism by virtue of a noise pulse obliterating all or a portion of a computer transmitted word, the terminal thus affected will only remain unsynchronized for a single counter cycle and will transmit a single erroneously timedword, at most, to the computer before resynchronism is achieved.

Another aspect of the invention is the nature of the "idle" word transmitted by the computer to the terminals when it has no message word to be sent to the terminals. This idle word advances the counters in all of the terminals. The computer also transmits at least a pair of the idle words before transmitting the resynchronization word. The idle word has a unique configuration which will cause any terminal which is unsynchronized with respect to the bits within a transmitted word to regain synchronization during the transmission of the two idle words so it is in correct bit synchronization with the reset word. In the preferred embodiment of the invention, wherein the start bit of each word is a zero, the idle word consists of an 8-bit word having a single zero followed by all ones. Thus, if a terminal does not have correct bit synchronization and considers the zero or start pulse at the beginning of the first idle word to be part of the message content of the previous word, it will then synchronize with the subsequent start bit of the second idle word to regain correct bit synchronization before the reset word is transmitted.

In the preferred embodiment of the invention the system is full duplex and when a terminal recognizes identity between its counter state and its address it immediately transmits the next word of any message which it may have for the computer in the return channel, simultaneously with the transmission of messages from the computer to terminals on the other channel. Certain aspects of the invention are also applicable to a half duplex system wherein a computer allows a time slot for a terminal to reply after transmitting a word which will advance the counters of all of the terminals.

but this arrangement is relatively wasteful of channel capacity since a time slot must be provided for a reply even if no reply is made.

The generic concepts of the invention are also applicable to "hierarchy systems" wherein the computer or central station communicates with a plurality of satellite stations which in turn each communicate with a plurality of terminals. Two alternative forms of these hierarchy systems are subsequently described in detail. In one arrangement, each time the central computer transmits a word a main counter is advanced in each of the satellite counters to effectively allow the satellites to sequentially transmit to the main terminal when their addresses coincide with their counter's state. The satellite terminals also each contain secondary counters which are advanced by one count each time the main counter reaches a state which identifies with that satellite's address. The secondary counter effectively acts to connect the satellite successively to each of its serviced terminals so as to allow those terminals to communicate with the master. Suppose each satellite services five terminals numbered 1 through 5. The first time a satellite can communicate with the master by virtue of its main counter equating with its address it transmits a message from terminal 1, if a message is available at that terminal; the next time it transmits a message from terminal 2, etc. The central station also contains a secondary counter so it can determine a particular terminal being addressed at any instant through a satellite. Any form of polling technique, including the form of the present invention may be employed to allow the satellite to communicate with its terminals. Thus, when the central station sends out a message it may be routed via the satellite stations to each of the terminals and counters in each of these terminals may be advanced periodically. Alternatively, the satellite could for example transmit the addresses of each of its terminals in sequence to determine if any of them have a message for the central computer.

An alternate form of heirarchy system allows all of the terminals connected to a satellite terminal addressed by the central station to sequentially communicate to the central station under the control of a counter in the satellite terminal which is advanced as sequential words are received from the central station. A register containing a count equal to the number of terminals serviced by a particular satellite being addressed is decremented by one count each time a word is sent out by the central computer. When this counter has reached zero, the central station is free to address any other satellite and its terminals are sequentially allowed to communicate with the central station, through the satellite terminal, as sequential words are transmitted by the central station.

These hierarchy arrangements have a special value where a very large number of terminals are employed, as in an interactive cable television system, since they overcome the problem of avoiding overlap of messages transmitted from the terminals to a central station because of the delay or storage time of the communication channel. For example, when two terminals have sequential addresses because they were added to the system in sequential order and yet are separated by a distance of 20 miles, the polling rate of the system must be very slow in order to allow time for the return message from the further terminal to be received before the nearer terminal sends out its return message. One alternative is to poll the terminals in a sequence proportional to their distance from the central station. This involves either renumbering all of the terminals or using a non-sequential polling list when terminals must be added to the system intermediate to its ends.

Using the hierarchy form of the present invention, the terminal to be added in the middle of the system is simply hung on to the geographically closest satellite terminal. With these techniques the polling rate need only be sufficiently slow to allow non-interfering responses from two sequentially addressed satellite terminals. Newly added terminals are introduced into this properly spaced sequence without any necessary modification of a head-end address list or the addresses of all of the terminals but simply require an adjustment to those registers which contain the number of terminals associated with a satellite.

In this form of hierarchy system means may conveniently be provided for modifying the address register of particular satellite terminals from the head end so that satellites may be conveniently addressed in the sequence of their distance from the central station in a consecutive order. In a growing area if the satellite terminal is to be added between two existing satellite terminals, all of the existing terminals can be renumbered from the head end without the expense of performing a service call at each of the satellites to revise their address registers.

Other objectives, applications and advantages of the present invention will be made clear by the following detailed description of two preferred embodiments of the invention. The description makes reference to the accompanying drawings in which.

Figure 1:
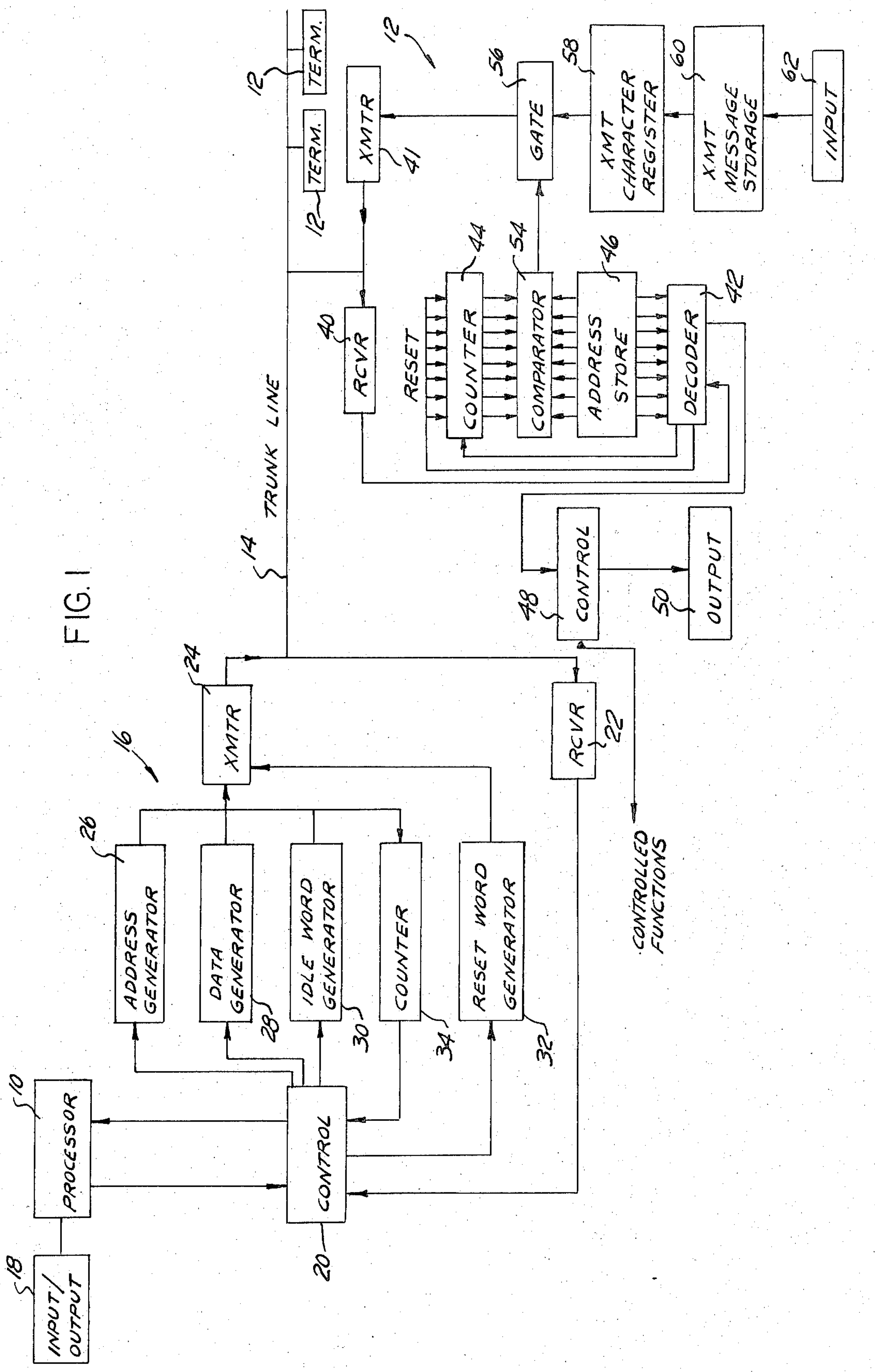
FIG. 1 is a schematic diagram of a data communication system involving a central station and a plurality of remotely located terminals formed in accordance with the teachings of the present invention.

Referring to the drawings, the system of FIG. 1 represents a remote terminal system connecting a processor 10 to a plurality of remote terminals 12. The system may typically be employed in a two-way community cable television system of the type disclosed in Face et al. U.S. Pat. No. 3,668,307. In the system of the contents of that patent the processor 10 would be located at the head end of the network and act to supply TV and terminal control signals to the network and the terminals 12 would be located at the receiver stations; typically in residences or commercial or industrial establishments subscribing to the service. The processor 10 would be connected to the terminals 12 by a trunk line 14 typically taking the form of a coaxial transmission cable. Only those parts of the system are illustrated which facilitate the transfer of digitally encoded information and control signals between the processor and the terminals. The processor 10 forming part of the head end or central station, generally indicated at 16, will typically have its own input-output capability indicated by the unit 18. It will exchange digital data and control signals received from and to be transmitted to the terminals 12 by the trunk line 14 through a control sub-system 20. The control sub-system accepts information transmitted to the central station 16 from the terminals 12 from a receiver or demodulator 22 directly connected to the trunk line 14. The control unit 20 provides this received data to the processor 10.

A transmitter 24, consisting of a carrier generator and modulator also forms part of the central station 16 and provides its output directly to the trunk line 14 for transmission to all of the terminals 12. Signals to be transmitted by the central station are provided to the transmitter 24 from an address generator 26, a data generator 28, an idle word generator 30, and a reset word generator 32, all of which receive the output of the control unit 20. When sending a message to the terminals 12, which will preferably consist of a plurality of 10-bit words (8 data bits, a start bit and a stop bit), the control unit 20 will first cause the address generator 26 to generate a word (or a series of words if the number of terminals on the trunk line exceeds the number that can be defined in the eight data bits of a single 10-bit word) which define the terminal addressed by the subsequent message. Next, a data generator 28 generates the 10-bit digital word or series of words that are to be transmitted to the terminal so addressed. During any time period when there is no address or data word to be transmitted to a terminal by the trunk line 14, the control 20 causes the idle word generator 30 to provide one or a series of 10-bit idle words which will exercise no control over the terminals 12 other than to cause the counters therein, which will be subsequently described, to advance.

A counter 34 receives the outputs of the address generator 26, data generator 28, and idle word generator 30 and advances by one count for each word so generated. The counter provides its output to the control unit of terminals 12 connected to the trunk line 14, the control causes the idle word generator 30 to output a series of two idle words whether or not messages are available to be sent to one of the terminals. Next, the control unit 20 actuages a reset generator 32 to output a specialized word via the transmitter 24 which will be recognized by all of terminals causing them to reset their counters. The nature of the idle word and the reason two idle words are sent before a reset word will be subsequently described in more detail.

Turning now to a more detailed study of a typical terminal, the terminal includes a demodulating receiver 40 and a transmitter 41 which generates an appropriate carrier and modulates it on the basis of the information provided to it by the terminal.

Each terminal receives all of the information provided to the line by the transmitter 24 in the central station 16. The demodulated receiver signals are provided by the receiver 40 in each terminal to a decoder 42. The decoder examines each word provided to it by the receiver 40. Each word, whether it be an address, data, an idle word or a reset word causes the decoder to provide an advance pulse to a counter 44 which is functionally identical to the counter 34 contained in the central station 16.

The decoder 42 also receives the parallel output of the address storage unit 46 which contains the unique address for that terminal. The decoder 42 between the receipt of a "start of heading" code and a subsequent "start of text" code assembles the eight data bits of each word received and when it recognizes an identity between a word and its address as provided by the unit 46, it provides the subsequent data words which follow the "start of text" code to its control unit 48 for proper action. Any number of terminals may be addressed between a "start of heading" code and a subsequent "start of text" code and all of them will receive the subsequent codes. The control unit is connected to an output unit for the terminal 50 which may take the form of a cathode ray tube display, printer or audio output device, and the control unit 48 also has an output line 52 which may actuate associated control functions. For example, if the system is a two-way cable television terminal, signals from the control may control the tuner of a television receiver to give it access to a particular channel transmitted over the cable 14.

However, even if the decoder does not recognize its own address as preceding a message, the address and the subsequent data words are recognized and cause the decoder to send advance pulses to the counter 44.

The output of the counter 44 is provided to a comparator 54 which also receives the unit's address from the address store 40. When the count in the counter 44 reaches a number equal to the address of the terminal, the comparator 54 recognizes this identity and provides an output signal to a gate 56. The gate connects the output of a transmit character register 58 to the transmitter 42 to cause the transmission of a single character if such a character is available in the register 58. Thus, a single character contained in the register 58 is transmitted over the trunk line 14. As has been noted, in the preferred embodiment the transmission from the terminal 42 to the central station 16 is performed in full duplex with the transmissions from the central station to the terminal. The return transmission will typically be at a different frequency than the outgoing transmission.

At the head end 16, the 10-bit word representing the character transmitted by the terminal is decoded by the receiver 22 and applied to the control unit 20. The control unit identifies the source of the word by examining the state of the counter 34, which effectively contains the address of the terminal which originated that transmission.

The transmit register 58 can then be refilled from the transmit message storage unit 60 which stores information received from the input unit 62 associated with the terminal, which may be a keyboard, or in the case of an industrial inspection system the output of a transducer measuring parts produced by a machine associated with the terminal. If the frequency with which the systems polls a particular terminal exceeds the rate of generation of a character by the input device 62, there is no need for a transmit message storage unit 60 but the transmit character register 58 may form the total buffer for the input device.

The transmit message storage unit 60 may act as a buffer between any data source having a higher data rate than that part of the terminal-computer channel which may be considered to be assigned to a particular terminal. For example, the remote device might be connected to the terminal either directly or through use of this technique. The entire data may be coupled to other data systems having different data rates.

In the case of a two-way cable television network, the input may be a request by the television subscriber for access to a particular program being broadcast along the trunk line 14. This request will be considered by the processor 10 and if the terminal should be granted access to that channel a message will be addressed to that terminal which will cause its control unit 48 to make the change. The processor will typically store this request information for billing purposes.

In an industrial application, a particular input may constitute a request for the display of a particular production schedule or the like. The processor 10 screens the request to determine whether the inquiring station is entitled to the requested material and if an affirmative decision is made transmits it for printing or display on the output device 50.

When a reset word is recognized by the decoder 42 it will provide a signal to the counter causing the counter to reset to an initial value. If this reset word is properly interpreted by the decoder it will cause the counter 44 to resynchronize with the counter 34 contained in the central station and the counters 44 contained in all of the other terminals if it became desynchronized since the last reset word. Assuming a reset word is sent once each cycle of the counters, this will insure that the most the terminal 12 could have transmitted at an improper time is a single character. The processor 10 may have the capability of recognizing a single character error in a message through the use of redundancy, formating or parity checks. It could request the terminal to retransmit the character or it might reconstruct the proper message from the remaining characters. The decoder must also have bit within word synchronization in order to recognize its own address so as to route a subsequent message to its control unit 48, and to recognize a special character signifying the termination of a transmission addressed to it by the central station 16.

In order to assure that the counter is reset at the proper time, the decoder must have proper bit synchronization with the transmission from the central station 14. In order to insure that this bit synchronization is achieved prior to the receipt of a reset word, so that the decoder will properly recognize the reset word and resynchronize the counter 44, the control 20 of the central station 16 causes at least two idle words from the generator 30 to be transmitted before a reset word. The idle word has a unique format which assures resynchronization within a two-reset word group. In the preferred embodiment, this unique configuration consists of a single zero followed by nine ones. The zero is the start bit used with all words in a system. If a decoder 42 has lost bit synchronization within a word prior to the receipt of a first idle word, it will treat the start bit of that idle word as part of the previous word, rather than as the start of a new word. At some point within the first idle word the desynchronized decoder considers the previous word to have ended and it will then wait for the next zero to resynchronize. Since the next zero will occur at the start bit of the second idle word in the group the decoder 42 will thus gain bit-within-word resynchronization prior to the receipt of the following reset word and will properly identify that reset word and cause its counter to reset at the proper time to regain synchronism with the head end counter 34 and with the counters of the other terminals.

The system thus described time-shares the communication channel between the terminals and the central station in a highly efficient manner without the necessity of transmitting addresses to the terminals to query them and without the necessity of terminals identifying their transmissions to the central station with addresses. The use of the idle words and the reset words to maintain synchronization of the counters eliminates desynchronization for any substantial period of time. The use of the duplex channel avoids the problem of central station spacing its transmission to avoid interference with returning messages because of the line storage time.

Since a word is only sent to the head end by a terminal if it has an affirmative response to provide, the control 20 and processor 10 need not be diverted to the task of processing responses which indicate that the terminal has no message to send, as is required by many prior art systems.

In the system of FIG. 1, when a large number of terminals are employed, care must be taken to obviate the possibility of the messages from two sequentially addressed terminals interfering with one another because of trunk line storage or delay time. This involves timing the words sent out by the transmitter so that the central station can receive a message from the farthest terminal on the line before the closest terminal on the line, which may be the next terminal addressed, sends its message. Alternatively, the terminals can be given addresses which are functions of their distances from the central station so that more than one return message can be on the trunk at a time but the messages do not interfere with one another. This arrangement presents difficulty in a system such as two-way cable television network wherein a subscriber terminal at any point on the line may be added at any time. Re numbering all of the terminals each time a subscriber is added presents great difficulties.

Figure 2:
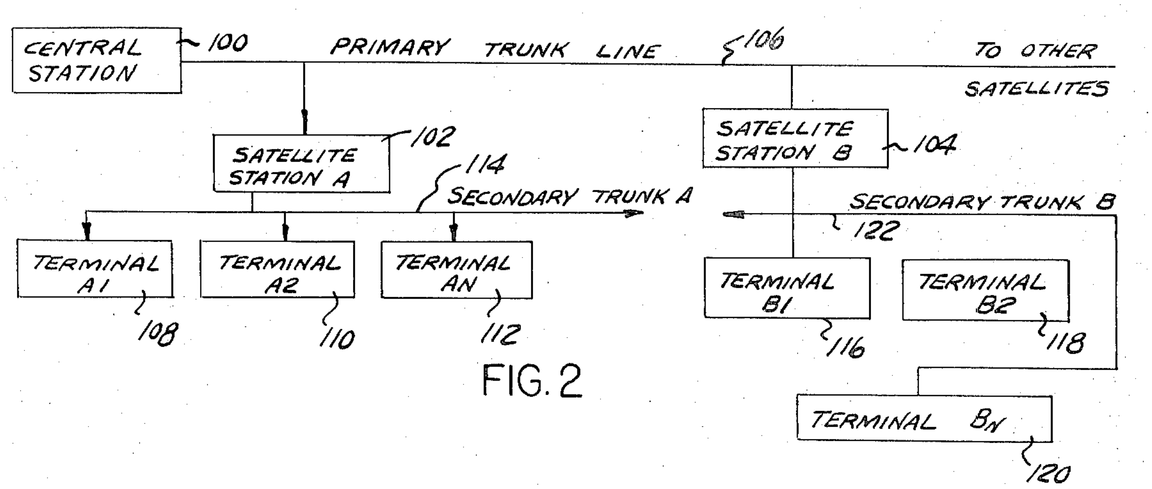
FIG. 2 is a block diagram of a generic form of a heirarchal remote terminal data communications system using the teachings of the present invention.

To overcome these problems a secondary aspect of the invention involves a hierarchy system involving satellite stations. FIG. 2 broadly illustrates such a system. A central station 100 is connected to a plurality of satellite stations 102, 104, etc. through a primary trunk line 106 such as a bi-directional coaxial cable. Each satellite station is connected to a plurality of terminals which are located in the same geographical area as the satellite through a secondary trunk. For example, satellite station 102 is connected to a number of terminals 108, 110 and 112 through a secondary trunk 114 which may be substantially identical to the primary trunk line. Likewise the satellite station 104 is connected to a number of terminals 116, 118 and 120 through a secondary trunk 122. Broadly, in the operation of this system, the satellite stations are sequentially addressed using an arrangement substantially identical to the arrangement of FIG. 1; that is, counters are contained in the central station 100 and each of the satellite stations 102, 104. Each time a word is sent out by the central station all of the counters advance. Each of the satellite stations has a unique address and that address is compared to its counter-status and when the two are in accord the satellite can reply. When a satellite replies it sends a message from one of its associated terminals. The next time that satellite's address counter matches its address it sends a message from another of its terminals and so on. The central station 100 contains counters which allow it to identify not only the satellite from which the reply is received, but also the particular terminal associated with that satellite which originated the message.

Figure 3:
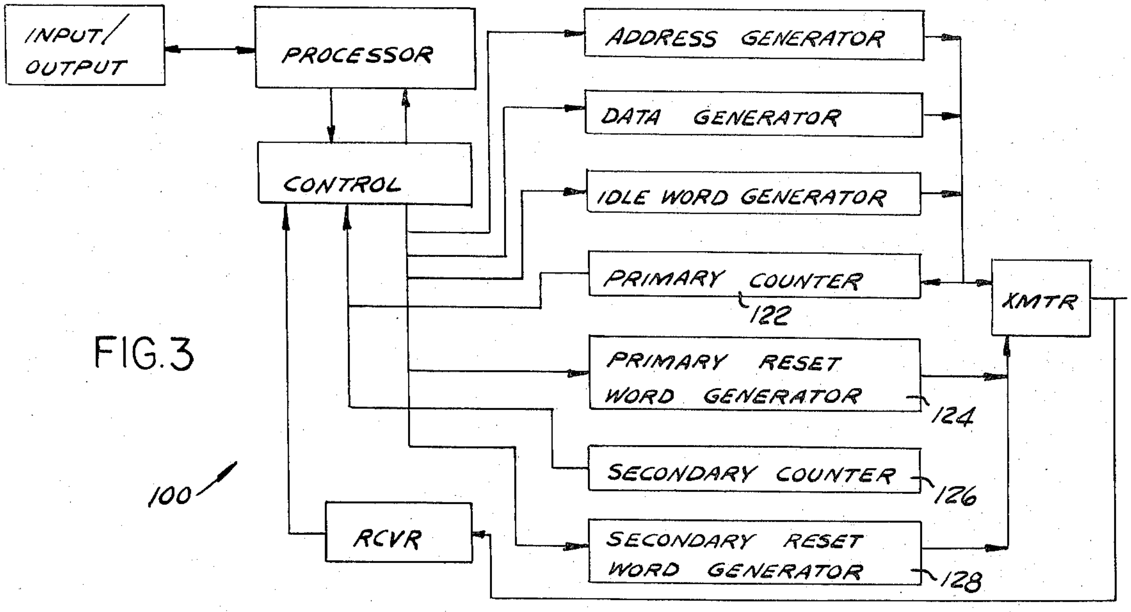
FIG. 3 is a detailed block diagram of the central station of a system of the general type of FIG. 2 and constituting a second embodiment of the invention.

The configuration of the central station 100 is illustrated in more detail in FIG. 3. Most of the elements of the transmitter are identical to the transmitter of FIG. 1 and these are not numbered in FIG. 3. The central station includes a primary counter 122 which counts the words outputted by the transmitter on the basis of signals supplied by an address generator, a data generator and an idle word generator in the same manner as the system of FIG. 1. When this primary counter 122 has reached a count equal to the number of satellite stations on the line, a primary reset word generator 124 causes the transmitter to output a word which resets counters in all of the satellite stations. Each time this occurs a secondary counter 126 is advanced by a single count. The control unit receives the output of both the primary and secondary counters and thus identifies a received message on the basis of the status of both of these counters. When the secondary counter 126 has attained its full count, typically the maximum number of terminals associated with any satellite, the control unit causes a secondary reset word generator 128 to provide an output to all the satellites, which word is either passed or echoed by each satellite to its associated terminals.

Figure 4:
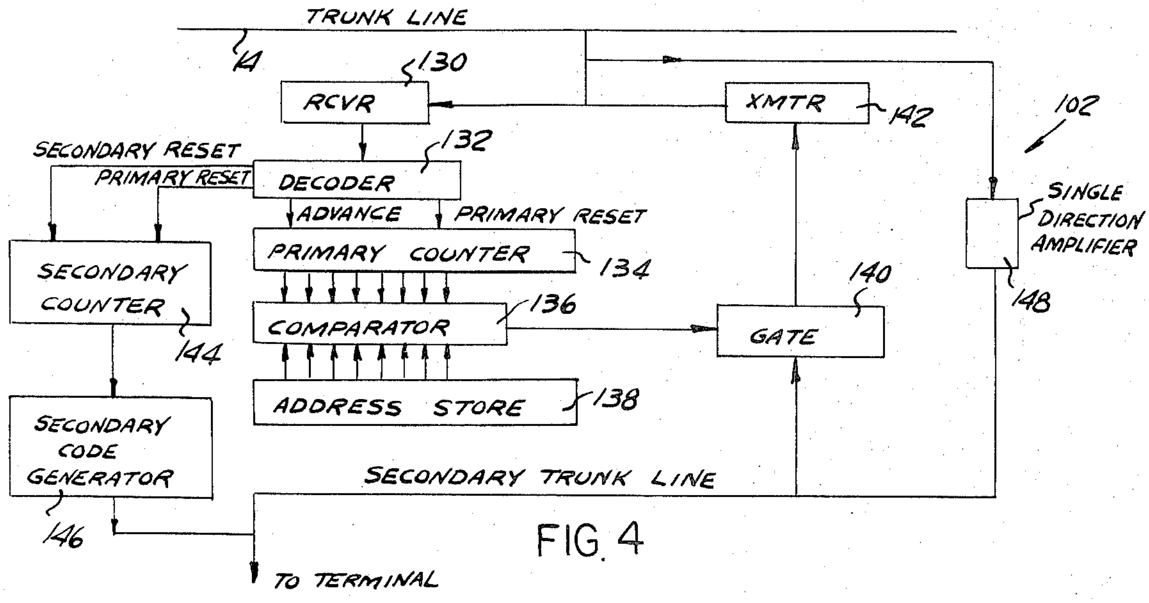
FIG. 4 is a block diagram of a typical satellite terminal used in connection with the central station of FIG. 2.

A typical satellite station such as 102 is illustrated in detail in FIG. 4. The trunk line 14 is connected to demodulating receiver 130 which provides its output to a decoder 132. The decoder provides an output to a primary counter 134 upon the occurrence of each transmitted word, other than resets. This counter provides its output to a comparator 136 which also receives the output of an address store 138 which is unique to this satellite station. Upon occurrence of coincidence between the state of the primary counter and the address store a signal is provided to a gate 140 connecting the secondary trunk 114 to a transmitter 142 which provides output to the trunk line 14.

Each time the decoder 132 recognizes a primary reset word an appropriate reset signal is sent to the primary counter 134 causing it to reset. The decoder 132 also provides a pulse to a secondary counter 144 each time a primary reset word is recognized. This counter accordingly changes state each time the primary counter 134 has undergone a complete cycle and is reset. The output of the secondary counter is used to actuate a secondary code generator 146 to provide an output signal on the secondary trunk line 114 to the terminals associated with the satellite 102. The secondary trunk line 114 is also connected to the primary trunk line through a uni-directional amplifier 148. This provides the associated terminals with all of the information transmitted by the central station 100 but prevents any transmission from an associated terminal to pass directly through the trunk line as opposed to through the gate 140 to the transmitter 142. In addition to receiving the information transmitted by the central station 100, each of the terminals associated with the satellite station 102 receives the secondary code provided by the generator 146. The terminals 108, 110, 112, etc. are identical to the terminal 12 illustrated in FIG. 1 with the exception of the fact that their address is longer and is compared with the status of their counter plus the secondary code generated by the unit 146. Thus, one and only one of the terminals associated with the satellite station will be conditioned to transmit at the time the primary counter 134 reaches the code of that satellite station. However, the secondary counter 144 will be advanced and the next time the counter 134 reaches the code of that satellite station the next associated terminal will be conditioned to transmit to the central station.

In a system of this configuration the satellite stations are spaced with respect to one another. When a new subscriber is to be added to the system, it is simply connected to the closest satellite station. Since all of the other terminals connected to that satellite station are approximately equidistant from the central station, they will all have approximately the same propogation time. Accordingly, the transmission from the new terminal station will not interfere with the transmissions from the adjacently addressed terminals associated with other satellite stations. This arrangement avoids the necessity of renumbering the stations when a new terminal is added and allows the terminal to be added anyplace where a satellite station has additional capacity for it.

Means might also be provided for modifying the address registers of the satellite stations from the head end in accordance with known techniques so that a new satellite terminal may be inserted on the trunk line between a pair of existing satellite terminals and all the satellites renumbered so that they may continue to be addressed in the sequential order of their distances from their head end. Systems of this type are highly useful in industrial situations wherein all of the terminals associated with one satellite provide measurements of different parameters associated with the operation of a particular machine. Scanning one parameter for each machine allows common parameters for a number of machines to be received and compared within a short period of time. For example, one of the parameters may be operating temperature. The information relating to the operating temperature of a number of machines may be useful to the processor for a number of purposes.

Figure 5:
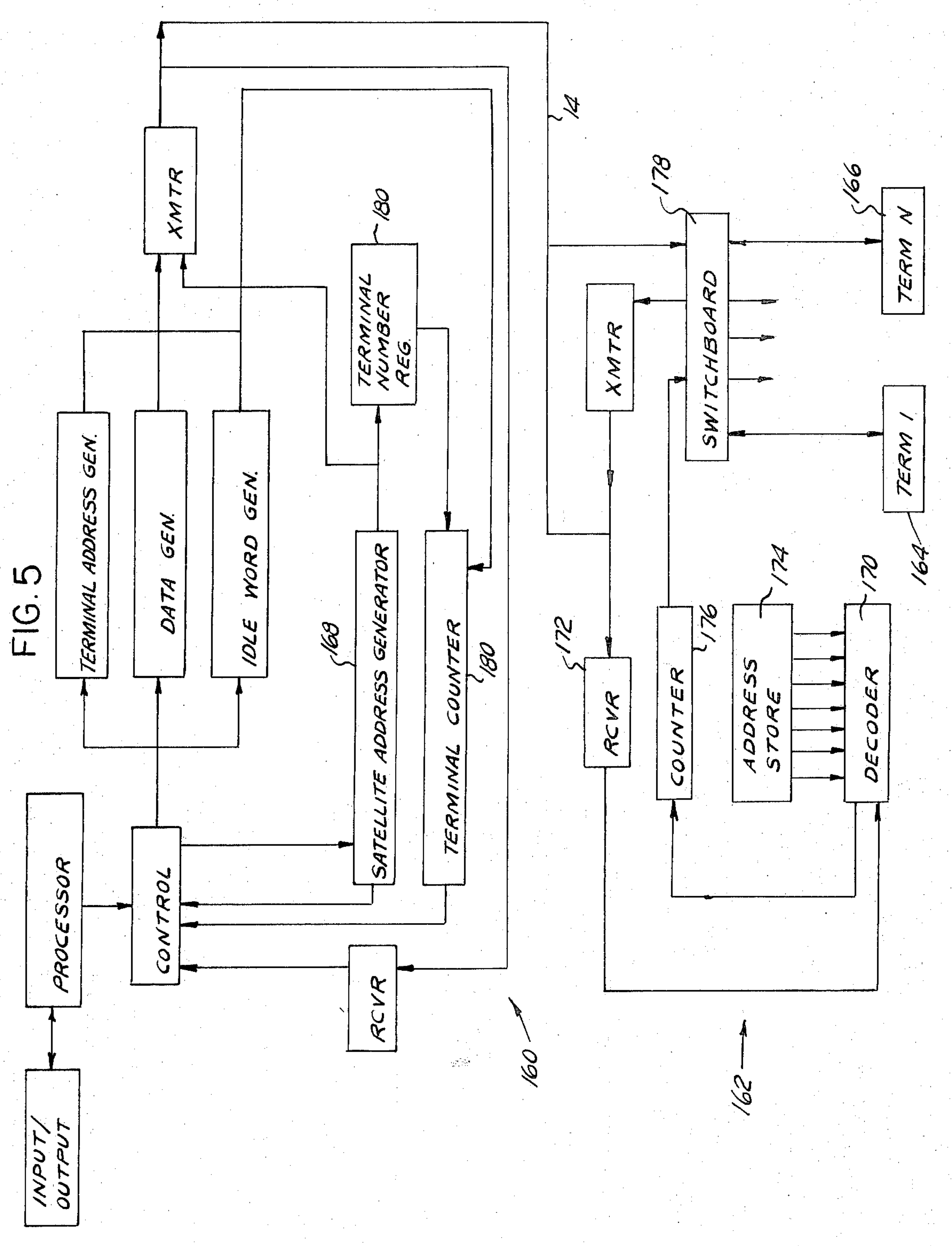
FIG. 5 is a block diagram of a second form of hierarchal system constituting a third embodiment of the invention.

An alternate embodiment of a heirarchal type system is illustrated in FIG. 5. In this system, a central station generally indicated at 160 communicates with a plurality of satellites, one of which is generally indicated at 162 and each satellite services a plurality of remote terminals, 164, 166, etc. In addition to those conventional subsystems of the type illustrated in FIG. 1, the transmitter has a satellite address generator 168, which operates under the direction of the control to address one of the satellite terminals. The decoder 170 which receives the output of receiver 172 of the satellite terminal compares a transmitted address with the satellite address contained in a store 174. When the two are in accord a counter 176 is preset to a number equal to the number of terminals associated with that satellite. Each additional word received by the satellite 162 from the central station 160 causes the counter 176 to be decremented by one unit. The counter controls a switchboard 178 which effectively couples one of the terminals 164, 166, at a time to the trunk line under control of the counter 176.

When the satellite address generator 168 in the central station transmits an address so as to activate a particular satellite, it simultaneously activates a terminal number register 180, to preset a number into a terminal counter 182, which number is equal to the number of terminals associated with the satellite so addressed. This number is the same as the number that was preset into the counter 176. A different number of terminals may be associated with each satellite and accordingly the terminal number register 180 contains a number for each satellite and loads that number in the terminal counter 180 upon the transmission of that satellite's address by the generator 168.

The terminal counter 180 is counted down by output words from the transmitter and the status of the terminal counter 180 is made available to the control so that the control may identify the terminal originating a return message.

The terminals 164 and 166 are effectively sequentially connected to the trunk line 14 through the switchboard 178 under the control of the counter 176 or alternatively they may be sequentially polling the terminals by the satellite. For example, using the method of this invention or any other method they may each contain a counter which is equivalent to the counter 176 and may compare the status of that counter with an address register.

In this form of system all of the terminals associated with a particular satellite are examined in sequence. Since the terminals are closely spaced to one another geographically, the polling rate may be higher than the rate used with the system of the type illustrated in FIGS. 2–4. Again, means might be provided for changing the address of a satellite from the head end in the event that a new satellite is inserted between two existing satellites.

When one satellite has gone through a complete cycle and effectively polled all of its terminals and the head end sends out a new satellite address from the address generator 168, a longer cycle time must be employed to wait for the first reply following the transmission of this address because of the greater distance between satellite terminals than exists between terminals associated with a given satellite.

The embodiments of the invention in which an exclusive property or privilege is claimed are defined as follows:

1. A digital communication system including a master station and a plurality of remote terminals all connected by a communication channel including; means for storing a unique address at each of the terminals; counters associated with the master station and each of the remote terminals; means at each remote terminal for detecting coincidence between the status of its counter and its address storage means; means at the master station for sending digital words to all of the remote terminals, said words including an address of one of the terminals followed by data to be received by that terminal; means for advancing the master counter and each of the terminal counters each time a digital word is sent from the master to any of the terminals; and means at each terminal allowing the terminal to send a message to the master upon the occurrence of coincidence between that terminal's counter and its address memory.

2. The system of claim 1 wherein means are provided for periodically resetting the master counter and all of the terminal counters.

3. The system of claim 2 wherein the means for resetting the master counter and the terminal counters comprises a unique synchronizing word generated by the master and transmitted to all of the terminals.

4. The system of claim 1 wherein the system is full duplex and the measages transmitted from a terminal to the master are sent simultaneously with the transmission of digital words from the master to the terminals.

5. The system of claim 1 wherein in the absence of a message digital word to be transmitted from the master to the terminals the master transmits an idle word which advances the counters at all of the terminals.

6. The system of claim 5 wherein an idle word consists of a plurality of bits, the first of the bits being of one state and the balance of the bits being of the opposite state.

7. The system of claim 6 wherein the master station periodically transmits a synchronizing word to all of the terminals and wherein at least two idle words are sequentially transmitted by the master station before each synchronizing word.

8. The system of claim 1 wherein each terminal services a plurality of secondary terminals and following the occurence of identity between the counter associated with a terminal and the address of that terminal, that terminal transmits a message from one of said secondary terminals to said master.

9. In a computer system having a central station, a plurality of satellites, and a plurality of terminals connected to said central station through said satellites, a first counter associated with said central station; first counters associated with each of said satellites; means for advancing the first counter associated with the central station and the first counters associated with the satellites upon each transmission of a digital word from the central station to the terminals, and means associated with each satellite for directing communications from its associated terminals to the central station under control of that satellite's first counter.

10. The computer system of claim 9 wherein the central station and each satellite contain a second counter and the transmission of a communication from a terminal associated with a satellite to the central station is performed under control of the second counter associated with that satellite as well as the first counter associated with that satellite.

11. The computer system of claim 9 wherein each satellite has a unique address and wherein means are provided for allowing transmissions from a remote terminal associated with a satellite to the central station only following the central station transmitting the address of that particular satellite.

12. The computer system of claim 11 wherein a satellite operates to transmit messages from various of its terminals to the central station during the time its counter undergoes a number of changes of state equal to the number of terminals associated with that satellite following the transmission of the address of that satellite by the central station.

13. The computer system of claim 9 including means, associated with the central station, for transmitting messages to all of the satellites to effect the resetting of the first counters in all of the satellites.

14. A digital communication system including a central station and a plurality of terminals located remotely from one another and from the central station and all connected by a communication channel comprising; means for transmitting a plurality of digital words from the central station to the remote terminals over the communication channel, the words consisting of addresses of the terminals and message words for the terminals; means for storing a unique address at each of the terminals; counters associated with each terminal, the counters being advanced upon the reception of each digital address word and message word from the central station; message storage means associated with each terminal; and means for transmitting a message from the message storage means associated with a particular terminal to said central station upon the occurrence of identity between the address of that terminal and its associated counter.

15. The digital communication system of claim 14 wherein the terminal transmits a single digital message word to the central station each time identity is established between its associated counter and its unique address word.

16. The digital communication system of claim 15 including data input means connected to said message storage means, said data input means having a data rate which differs from the data rate at which said terminal may transmit messages to said central station.

17. The digital communication system of claim 14 including a counter at the master station which is advanced upon the transmission of a digital word from the master station to any of the terminals.

18. The digital communication system of claim 17 including means for periodically resetting the master counter and all of the terminal counters.

19. The digital communication system of claim 14 wherein the communication channel is bidirectional and in a transmission from a terminal to the central station following the occurrence of coincidence between that central station's counter and its unique address may occur simultaneously with the transmission of digital words from the central station to the terminals.

20. A computer system having a central station; a plurality of satellites; a plurality of terminals connected to said central station through said satellites; means for advancing the counter associated with the central station and the counters associated with the satellites upon each transmission of a digital word from the central station to the terminals; and means associated with each satellite for directing communications from one of its associated terminals to the central station upon that terminal's counter attaining a predetermined state.

21. The computer system of claim 20 wherein each satellite has a unique address and each satellite directs the communication from one of its associated terminals to the central station upon occurrence of coincidence between that satellite's counter and the satellite's unique address.

* * * * *